Patented Jan. 9, 1934

1,942,668

UNITED STATES PATENT OFFICE 1,942,668

STORAGE BATTERY SEPARATOR

Edward W. Smith, Philadelphia, Pa., assignor to The Electric Storage Battery Company, Philadelphia, Pa., a corporation of New Jersey No Drawing. Application April 2, 1929
Serial No. 352,047

3 Claims. (Cl. 136—145)

An object of my invention is to produce an improved storage battery separator having a long life because it is composed of materials inert both to the action of the electrolyte of the battery and to the oxidizing effect of the active material of the positive plate.

Another object of my invention is to produce a separator having sufficient porosity to permit the diffusion of electrolyte through the pores of the separator and to permit the passage of electric current between the plates.

A further object of my invention is to produce a separator having pores sufficiently minute to prevent particles of active material, becoming dislodged from the plates, from projecting across from one plate to another to form a short circuit.

Still another object of my invention is to produce a separator having sufficient mechanical strength to be substituted for the wood veneers now customarily used as separators in storage batteries or to be used between such a wood veneer and a positive plate.

One form of my invention consists in applying a mixture of sodium silicate and a siliceous powder, of which preferred example is infusorial earth, to the surface of a sheet of fibrous material inert to both the action of the electrolyte and the oxidizing effect of the positive plate of the storage battery, such as asbestos or glass wool. The mixture of sodium silicate solution with a siliceous powder is made of the consistency of a thick syrup and applied to the surface of the sheet of fibrous material.

An alternate method of practicing my invention is to amalgamate the fibrous material and the mixture of sodium silicate and siliceous powder into a uniform mix and then roll or otherwise spread out the mix into the form of a sheet and allow it to set.

In either of these methods, after the mixture of sodium silicate and siliceous powder has set and hardened the separator is subjected to the action of dilute sulfuric acid which reacts with the sodium silicate. One of the compounds resulting from this reaction is sodium sulfate, which dissolves out, leaving the separator in a porous condition.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A separator for storage batteries which comprises in combination, an element adapted to be interposed between the active material of the positive and negative plates of a storage battery and which is fibrous and non-oxidizable by the action of the electrolyte or by the oxidizing action of the positive plate, and a mixture of sodium silicate and a siliceous powder which is applied to said element and which has set and hardened out of contact with sulphuric acid.

2. A separator for storage batteries which comprises in combination, a separator of glass wool and a mixture of sodium silicate and a siliceous powder applied to the glass wool and which has set and hardened out of contact with sulphuric acid.

3. A separator for storage batteries which comprises in combination, an element adapted to be interposed between the active material of the positive and negative plates of a storage battery and which is fibrous and non-oxidizable by the action of the electrolyte or by the oxidizing action of the positive plate, and a mixture applied to said element, said mixture being the residuum remaining after a mixture of sodium silicate and a siliceous powder has set and hardened on the element and has been subsequently immersed in dilute sulphuric acid.

EDWARD W. SMITH.